US010336636B2

(12) United States Patent
Showell et al.

(10) Patent No.: US 10,336,636 B2
(45) Date of Patent: Jul. 2, 2019

(54) METHODS FOR REDUCING EVAPORATIVE LOSS FROM SWIMMING POOLS

(71) Applicant: BiOWiSH Technologies, Inc., Cincinnati, OH (US)

(72) Inventors: Michael Stanford Showell, Cincinnati, OH (US); Rodney John Vautier, Cincinnati, OH (US)

(73) Assignee: BiOWiSH Technologies, Inc., Cincinnati, OH (US)

(*) Notice: Subject to any disclaimer, the term of this patent is extended or adjusted under 35 U.S.C. 154(b) by 185 days.

(21) Appl. No.: 15/341,283

(22) Filed: Nov. 2, 2016

(65) Prior Publication Data

US 2017/0121198 A1 May 4, 2017

Related U.S. Application Data

(60) Provisional application No. 62/249,594, filed on Nov. 2, 2015.

(51) Int. Cl.
*C02F 3/34* (2006.01)
*C02F 3/10* (2006.01)
*C02F 101/32* (2006.01)
*C02F 103/42* (2006.01)

(52) U.S. Cl.
CPC .............. *C02F 3/341* (2013.01); *C02F 3/108* (2013.01); *C02F 3/343* (2013.01); *C02F 3/348* (2013.01); *C02F 2101/32* (2013.01); *C02F 2103/42* (2013.01)

(58) Field of Classification Search
CPC .......... C02F 3/341; C02F 3/108; C02F 3/348; C02F 3/343
See application file for complete search history.

(56) References Cited

U.S. PATENT DOCUMENTS

| | | | |
|---|---|---|---|
| 5,627,069 A | 5/1997 | Powlen | |
| 6,025,152 A | 2/2000 | Hiatt | |
| 6,410,305 B1 | 6/2002 | Miller et al. | |
| 7,037,708 B1 | 5/2006 | Runge et al. | |
| 8,747,873 B2* | 6/2014 | Yin et al. | A01N 37/30 424/405 |
| 9,302,924 B1 | 4/2016 | Showell et al. | |
| 9,717,767 B2 | 8/2017 | Carpenter et al. | |
| 10,004,768 B2* | 6/2018 | Kubo | A61K 35/742 |
| 10,081,562 B2 | 9/2018 | Gorsuch et al. | |

(Continued)

FOREIGN PATENT DOCUMENTS

| | | |
|---|---|---|
| CN | 101473896 A | 7/2009 |
| CN | 101503664 A | 8/2009 |

(Continued)

OTHER PUBLICATIONS

Roberts, et. Al., "Bacillus mojavensis sp. Nov., Distinguishable from Bacillus subtilis by Sexual Isolation, Divergence in DNA Sequence, and Differences in Fatty Acid Composition," Intl. J. Systematic Bacteriology, Apr. 1994, p. 256-264. (Year: 1994).*

(Continued)

*Primary Examiner* — Chester T Barry
(74) *Attorney, Agent, or Firm* — Cooley LLP; Ivor R. Elrifi; Cynthia Kozakiewicz (57) ABSTRACT

The present invention relates to microbial compositions useful in treating swimming pool water to reduce water evaporation.

22 Claims, 2 Drawing Sheets

Specification includes a Sequence Listing.

(56) References Cited

U.S. PATENT DOCUMENTS

| | | |
|---|---|---|
| 2003/0109025 A1 | 6/2003 | Durand et al. |
| 2004/0042972 A1 | 3/2004 | Truong-Le et al. |
| 2006/0188978 A1 | 8/2006 | Grant |
| 2007/0060477 A1 | 3/2007 | Pedersen et al. |
| 2007/0134493 A1 | 6/2007 | Meghpara |
| 2008/0260923 A1 | 10/2008 | Kratky et al. |
| 2009/0042267 A1 | 2/2009 | Park |
| 2009/0269307 A1 | 10/2009 | Albers et al. |
| 2011/0014278 A1 | 1/2011 | Derrieu |
| 2011/0110894 A1 | 5/2011 | Drahos et al. |
| 2011/0256249 A1* | 10/2011 | Campbell ............... A61K 8/368 424/735 |
| 2011/0269220 A1 | 11/2011 | Van Slyke |
| 2012/0083412 A1 | 4/2012 | Trevino et al. |
| 2012/0084886 A1 | 4/2012 | Lopez-Cervantes et al. |
| 2013/0131121 A1* | 5/2013 | Tsuchida ................ A61K 31/11 514/345 |
| 2013/0337518 A1 | 12/2013 | Razavi-Shirazi et al. |
| 2014/0342437 A1* | 11/2014 | Carpenter ................ C12N 1/20 435/252.4 |
| 2016/0017622 A1* | 1/2016 | Regester ................... C02F 1/50 210/167.1 |
| 2016/0029666 A1* | 2/2016 | Carpenter ............. A23K 40/20 424/442 |
| 2016/0089403 A1* | 3/2016 | Kubo ................... A61K 35/742 424/489 |
| 2016/0312252 A1 | 10/2016 | Carpenter et al. |
| 2016/0326034 A1 | 11/2016 | Showell et al. |
| 2017/0042162 A1* | 2/2017 | Santra .................... A01N 59/20 |
| 2017/0334757 A1 | 11/2017 | Showell et al. |

FOREIGN PATENT DOCUMENTS

| | | | |
|---|---|---|---|
| CN | 101538538 | | 9/2009 |
| CN | 102399733 A | | 4/2012 |
| CN | 102987079 A | | 3/2013 |
| CN | 103484413 A | | 1/2014 |
| CN | 104232510 A | * | 12/2014 |
| CN | 103087918 B | | 4/2015 |
| DE | 19617331 A1 | | 11/1997 |
| EP | 0410877 A1 | | 1/1991 |
| EP | 0720974 A1 | | 7/1996 |
| GB | 2478929 A | | 9/2011 |
| JP | 2001/299328 | | 10/2001 |
| WO | WO-9856366 A1 * | | 12/1998 ............. A01N 47/44 |
| WO | WO-02078450 A1 * | | 10/2002 ............. A01N 35/06 |
| WO | WO 2009/038530 A1 | | 3/2009 |
| WO | WO 2010/138522 A2 | | 12/2010 |
| WO | WO 2014/189963 A1 | | 11/2014 |
| WO | WO 2015/056185 A1 | | 4/2015 |
| WO | WO 2016/019017 A1 | | 2/2016 |
| WO | WO 2016/070174 A1 | | 5/2016 |
| WO | WO 2016/073981 A1 | | 5/2016 |

OTHER PUBLICATIONS

Anonymous: "Biological Help for the Human Race Wastewater Treatment Solutions", 2011, pp. 1-12, Chicago, IL, USA.

Application Data Sheet 4950-01, Dissolved Oxygen Measurement in Wastewater Treatment, Water and Wastewater Industry, Emerson Process Management, http://www2.emersonprocess.com/siteadmincenter/PM%20Rosemount%20Analytical%20Documents/Liq_ADS_4950-01.pdf, 2009.

Baetge E. et al., "Complete nucleotide and deduced amino acid sequence of bovine phenylethanolamine N-methyltransferase: Partial amino acid homology with rat tyrosine hydroxylase," *Proceedings of the National Academy of Sciences* (1986) 83: 5454-5458.

Chan, Ada Mingwah "Investigation of Dairy Wastewater Using Biowish ™", M. Sc. Thesis, (Dec. 2014), p. 1-142.

Deng, Bin et al. "The Denitrification Characteristics of Pseudomonas stutzeri SC221-M and its Application to Water Quality Control in Grass Carp Aquaculture", PLOS ONE, vol. 9, No. 12, (2014), p. e114886.

Downes et al., "Determination of Cyanuric Acid Levels in Swimming Pool Waters by u.v. Absorbance, HPLC and Melamine Cyanurate Precipitation", Water Res., vol. 18, No. 3, pp. 277-280, (1984).

Encyclopedia of Food and Color Additives "Dextrose monohydrate. Soy lecithin" CRC Press (publisher). First edition (1997)CRC Press, Inc. Ed.: George A. Burdock, Ph.D., Boca Raton. FL., p. 1553-1554.

Gorsuch, J. P. et al. "Aerobic Nitrification and Denitrification among Heterotrophic Bacterial Isolates from a Commercial Water Treatment Product (Biowish ™ Aqua)", Dec. 2015.

Gude et al. "Biodiesel from waste cooking oils via direct sonication", Applied Energy, vol. 109, (2013), pp. 135-144.

Hageman, J.H. et al. "Single, chemically defined sporulation medium for Bacillus subtilis; growth, sporulation, and extracellular protease production" Journal of Bacteriology, (1984), 160 (1), p. 438-441.

Hellinga, C. et al. "The Sharon process; An innovative method for nitrogen removal from ammonium-rich waste water", Water Science and Technology, (1998), 37 (9), p. 135-142.

Hommes, N.G. et al. "Chemolithoorganotrophic Growth of Nitrosomononas eruopaea on Fructose. Journal of Bacteriology", (2003), 185(23), p. 6809-6814.

Huang, Ting-Lin et al. "Nitrogen Removal from Micro-Polluted Reservoir Water by Indigenous Aerobic Denitrifiers" International Journal of Molecular Sciences, (2015), vol. 16, No. 4, pp. 8008-8026.

Jetten, M.S.M. et al. "Microbiology and application of the anaerobic ammonium oxidation ('anammox') process", Current Opinion in Biotechnology, (2001), 12 (3), p. 283-288.

Kim, J.K. et al. "Aerobic nitrification-denitrification by heterotrophic Bacillus strains", Bioresource Technology, (2005), 96(17), p. 1897-1906.

Koops, H. et al. "Distribution and ecophysiology of the nitrifying bacteria emphasizing cultured species", FEMS Microbiology Ecology, (2001), 37(1), p. 1-9.

Lee, Eva "Investigation of a Commerical Product (Biowish ™) for Nitrogen Management", M. Sc. Thesis, May 2012, 150 pages.

O'Brien J. et al., "Equilibria in Aqueous Solutions of Chlorinated Isocyanurate", In A.J. Rubin, ed. Chemistry of Water Supply, Treatment, and Distribution, Chapter 14. Ann Arbor Science Publishers, Ann Arbor, Michigan (1974), 28 pages.

Prosser, J.I., "Autotrophic nitrification in bacteria" Advances in microbial physiology, (1989), 30, p. 125-181.

Rajakumar, S. et al. "Nitrate removal efficiency of bacterial consortium (*Pseudomonas* sp. KW1 and *Bacillus* sp. YW4) in synthetic nitrate-rich water" Journal of Hazardous Materials, (2008), vol. 157, No. 2-3, p. 553-563.

Sargent, M.G. "Control of cell length in Bacillus subtilis", Journal of Bacteriology (1975), 123(1), p. 7-19.

Schmidt, S.P. et al. "Reactions between dimanganese, dirhenium, and manganese-rhenium decacarbonyl and oxidants", Inorg. Chim. Acta, (1987), 131(2), p. 181-189.

Schmidt, I. et al. "New concepts of microbial treatment processes for the nitrogen removal in wastewater", FEMS Microbiology Reviews, (2003), p. 481-492.

Schreiber, F. "Detecting and Understanding Nitric Oxide Formation during Nitrogen Cycling in Microbial Biofilms" Dissertation, Universitaet Bremen, Bremen, (2009), 154 pages.

Shannon, M.A. et al. "Science and technology for water purification in the coming decades", Nature, (2008), 452, p. 301-310.

Shapleigh, J. "The Denitrifying Prokaryotes", The Prokaryotes (2006), 2, p. 769-792.

Strous, M. et al. "Missing lithotroph identified as new planctomycete", Nature (1999), 400, 7 pages.

Third, K.A. et al. "The CANON system (Completely Autotrophic Nitrogen-removal Over Nitrite) under ammonium limitation; Interaction and competition between three groups of bacteria", Systematic and applied microbiology, (2001), 24 (4), p. 588-596.

Tramper, J. et al. "Operating performance of Nitrobacter agilis immobilized in carrageenan", Enzyme and Microbial Technology (1986), 8 (8), p. 477-480.

Veljković et al. "Biodiesel production by ultrasound-assisted transesterification: State of the art and the perspectives" Renewable and Sustainable Energy Reviews, (2012), vol. 16, p. 1193-1209.

(56) References Cited

OTHER PUBLICATIONS

Verbaendert, I. et al. "Denitrification is a common feature among members of the genus *Bacillus*", Syst Appl Microbio (2011), 34(5), p. 385-391.
Wang, Pan et al. "Isolation and immobilization of new aerobic denitrifying bacteria", International Biodeterioration and Biodegradation, (2012), vol. 76, Jul. 9, p. 12-17.

* cited by examiner

Figure 1

Day 0

Day 1

Day 2

Figure 2

SEQUENCE LISTING

```
<160> NUMBER OF SEQ ID NOS: 1

<210> SEQ ID NO 1
<211> LENGTH: 1668
<212> TYPE: DNA
<213> ORGANISM: Bacillus subtilis

<400> SEQUENCE: 1
agctcggatc cactagtaac ggccgccagt gtgctggaat tcgcccttag aaaggaggtg      60
atccagccgc accttccgat acggctacct tgttacgact tcaccccaat catctgtccc     120
accttcggcg gctggctcca taaaggttac ctcaccgact tcgggtgtta caaactctcg     180
tggtgtgacg ggcggtgtgt acaaggcccg ggaacgtatt caccgcggca tgctgatccg     240
cgattactag cgattccagc ttcacgcagt cgagttgcag actgcgatcc gaactgagaa     300
cagatttgtg rgattggctt aacctcgcgg tttcgctgcc ctttgttctg tccattgtag     360
```

```
cacgtgtgta gcccaggtca taaggggcat gatgatttga cgtcatcccc accttcctcc    420
ggtttgtcac cggcagtcac cttagagtgc ccaactgaat gctggcaact aagatcaagg    480
gttgcgctcg ttgcgggact taacccaaca tctcacgaca cgagctgacg acaaccatgc    540
accacctgtc actctgcccc cgaaggggac gtcctatctc taggattgtc agaggatgtc    600
aagacctggt aaggttcttc gcgttgcttc gaattaaacc acatgctcca ccgcttgtgc    660
gggcccccgt caattccttt gagtttcagt cttgcgaccg tactccccag gcggagtgct    720
taatgcgtta gctgcagcac taaaggggcg gaaacccect aacacttagc actcatcgtt    780
tacggcgtgg actaccaggg tatctaatcc tgttcgctcc ccacgctttc gctcctcagc    840
gtcagttaca gaccagagag tcgccttcgc cactggtgtt cctccacatc tctacgcatt    900
tcaccgctac acgtggaatt ccactctcct cttctgcact caagttcccc agtttccaat    960
gaccctcccc ggttgagccg ggggctttca catcagactt aagaaaccgc ctgcgagccc   1020
tttacgccca ataattccgg acaacgcttg ccacctacgt attaccgcgg ctgctggcac   1080
gtagttagcc gtggctttct ggttaggtac cgtcaaggtg ccgccctatt tgaacggcac   1140
ttgttcttcc ctaacaacag agctttacga tccgaaaacc ttcatcactc acgcggcgtt   1200
gctccgtcag actttcgtcc attgcggaag attccctact gctgcctccc gtaggagtct   1260
gggccgtgtc tcagtcccag tgtggccgat caccctctca ggtcggctac gcatcgtcgc   1320
cttggtgagc cgttacctca ccaactagct aatgcgccgc gggtccatct gtaagtggta   1380
gccgaagcca ccttttatgt ctgaaccatg cggttcagac aaccatccgg tattagcccc   1440
ggtttcccgg agttatccca gtcttacagg caggttaccc acgtgttact cacccgtccg   1500
ccgctaacat cagggagcaa gctcccatct gtccgctcga cttgcatgta ttaggcacgc   1560
cgccagcgtt cgtcctgagc catgaacaaa ctctaagggc gaattctgca gatatccatc   1620
acactggcgg ccgctcgagc atgcatctag agggcccaat cgccctat              1668
```

METHODS FOR REDUCING EVAPORATIVE LOSS FROM SWIMMING POOLS

RELATED APPLICATIONS

This application claims priority to and benefit of U.S. Provisional Application No. 62/249,594, filed on Nov. 2, 2015, the contents of which are hereby incorporated by reference in their entireties.

INCORPORATION-BY-REFERENCE OF SEQUENCE LISTING

The contents of the text file named "BIOW-016-001WO-Sequence Listing.txt", which was created on Oct. 12, 2016 and is 2.5 KB in size, are hereby incorporated by reference in their entireties.

FIELD OF THE INVENTION

The present invention relates to methods for treating recreational water systems with compositions comprising micro-organisms in order to hydrolyze fats, oils, and grease present in the water into their constituent fatty acid and alcohol components, thereby clarifying the water while simultaneously creating a surface active film that aids in reducing evaporation and heat loss.

BACKGROUND OF THE INVENTION

Evaporation is a significant contributor to water loss, and a major contributor to maintenance costs, in residential and commercial swimming pools and spas. For example, the evaporative loss from an unoccupied 10,000 sq ft pool with a water temperature of 80° F., an air temperature of 78° F., and relative humidity of 50 percent is about 132 liters/hour or nearly 35 gallons/hour. See M. M. Shah, HPAC Engineering, Oct. 1, 2011. Over a 12 hour period at these conditions water loss can exceed 400 gallons. This volume can nearly double if the pool is fully occupied. It is, therefore, desirable to reduce or eliminate evaporation, especially in drought stricken areas such as the southwestern United States where water resources are limited.

Traditional pool covers consist of a physical barrier that is fitted over the pool surface when the pool is not in use. A properly fitted cover can reduce evaporative water loss up to 97% (See World Wide Web at daisypoolcovers.com.au/daisy-saves/evaporation/). However, physical covers are only effective when the pool or spa is not in use.

Recently, so called "liquid" covers have become available. These products spread a thin layer of surface active material over the surface of the pool creating a monomolecular film that suppresses water and heat loss. "Liquid" covers can provide some benefit even when the pool or spa is in use since the film is fluid and reforms after disruption by swimmers. The film-forming materials used in these products range from surface active polymers, such as modified polysiloxanes (Aquatain™) to simple fatty alcohols (waterSavr™).

A number of surface active materials are commonly introduced to pools and spas during use. Sunscreens and suntan lotions contain several different surface active ingredients including emollients such as isopropyl isostearate, caprylic/capric triglyceride, C12-C15 alkyl benzoate, and diisopropyl sebacate. Additionally, wax esters, cholesterol esters, and free fatty acids are present from human sebum. This collection of oily, greasy materials (typically referred to as FOG for Fats, Oils, Grease) represents a significant soil load, causing pool water to grow cloudy over time and forming a scum ring around the edge of the pool.

There is an opportunity to use these FOG materials as precursors to liquid films to aid in reducing water evaporation and retaining heat while simultaneously clarifying the water, reducing filter head pressure and pump run times by breaking the FOG components down into constituent fatty acids and fatty alcohols.

SUMMARY OF THE INVENTION

The invention provides microbial compositions for augmenting the treatment of commercial, public, and private recreational water systems such as swimming pools, spas, hot tubs or the like, and includes both salt water and fresh water systems.

In one aspect, the invention relates to a composition for treating the water in recreational waters, including a mixture of bacteria selected solely from the genus *Bacillus*, wherein each of the *Bacillus* in the mixture is individually aerobically fermented, harvested, dried, and ground to produce a mixture having a mean particle size of about 200 microns, with greater than about 60% of the powder in the size range between 100-800 microns and an inert carrier.

In some embodiments, the composition includes one to seven different *Bacillus* strains.

In some embodiments, the *Bacillus* is *Bacillus subtilis, Bacillus amyloliquefaciens, Bacillus licheniformis, Bacillus pumilus, Bacillus megaterium, Bacillus coagulans*, or *Paenibacillus polymyxa*. For example, the *Bacillus subtilis* is *Bacillus mojavensis* or *Bacillus subtilis* 34KLB.

In some embodiments, the inert carrier is anhydrous dextrose, dextrose monohydrate, dendritic salt or a mixture thereof. In some embodiments, the inert carrier is at a concentration of about between 75-99.9% (w/w).

In some embodiments, the composition further includes from 0.1 to 10% by weight of a supplemental fat, oil, or grease component. In some embodiments, the supplemental fat, oil, or grease component is triolein, tristearin, tripalmitin, soy lecithin, olive oil, almond oil, peanut oil, sunflower oil, rapeseed oil, soybean oil, linseed oil, corn oil, cod liver oil, palm oil, coconut oil, cacao butter, or various esters of lauric, myristic, oleic, palmitoleic, linoleic or arachinonic acids, and mixtures thereof, with glycerol, methanol, ethanol, propanol or isopropanol.

In some embodiments, the composition includes *Bacillus subtilis, Bacillus amyloliquefaciens, Bacillus licheniformis* and *Bacillus pumilus*.

In some embodiments, the composition has a moisture content of less than about 5%; and a final bacterial concentration of about $10^5$-$10^{11}$ colony forming units (CFU) per gram of the composition.

In another aspect, the invention relates to a composition for treating the water in recreational waters, including a mixture of bacteria selected from the genus *Bacillus*.

In some embodiments, each of the *Bacillus* in the mixture is individually aerobically fermented, harvested, dried, and ground to produce a mixture having a mean particle size of about 200 microns, with greater than about 60/o of the powder in the size range between 100-800 microns.

In some embodiments, the composition includes one to seven different *Bacillus* strains.

In some embodiments, the *Bacillus* is *Bacillus subtilis, Bacillus amyloliquefaciens, Bacillus licheniformis, Bacillus pumilus, Bacillus megaterium, Bacillus coagulans*, or *Pae-*

*nibacillus polymyxa*. For example, the *Bacillus subtilis* is *Bacillus mojavensis* or *Bacillus subtilis* 34KLB.

In some embodiments, the composition includes *Bacillus subtilis, Bacillus amyloliquefaciens, Bacillus licheniformis* and *Bacillus pumilus*.

In some embodiments, the composition further includes *Pediococcus acidilactici, Pediococcus pentosaceus*, and *Lactobacillus plantarum*.

In some embodiments, the composition further includes an inert carrier. For example, the inert carrier is anhydrous dextrose, dextrose monohydrate, dendritic salt or a mixture thereof.

In some embodiments, the composition further includes from 0.1 to 10% by weight of a supplemental fat, oil, or grease component. For example, the supplemental fat, oil, or grease component is triolein, tristearin, tripalmitin, soy lecithin, olive oil, almond oil, peanut oil, sunflower oil, rapeseed oil, soybean oil, linseed oil, corn oil, cod liver oil, palm oil, coconut oil, cacao butter, or various esters of lauric, myristic, oleic, palmitoleic, linoleic or arachinonic acids, and mixtures thereof, with glycerol, methanol, ethanol, propanol or isopropanol.

In some embodiments, the composition has a moisture content of less than about 5%, and a final bacterial concentration of about $10^5$-$10^{11}$ colony forming units (CFU) per gram of the composition.

In some embodiments, the inert carrier is at a concentration of about between 75-99.9% (w/w).

In another aspect, the invention relates to a method of treating the water in a swimming pool comprising contacting the water with any of the compositions of the invention.

In some embodiments, the water is contacted by contacting a swimming pool filtration unit with the composition.

In some embodiments, the composition is delivered directly into the swimming pool water.

In some embodiments, the composition is contained in a dosing device that is added to the pool and allows the composition to release over a period of time.

In some embodiments, treating the water in swimming pools results in increased clarity of the water, decreased fats, oils, and grease (FOG) concentrations, reduced water evaporation, better heat retention, reduced head pressure at the filter, reduced pump run time and/or energy savings.

Unless otherwise defined, all technical and scientific terms used herein have the same meaning as commonly understood by one of ordinary skill in the art to which this invention pertains. Although methods and materials similar or equivalent to those described herein can be used in the practice of the present invention, suitable methods and materials are described below. All publications, patent applications, patents, and other references mentioned herein are expressly incorporated by reference in their entirety. In cases of conflict, the present specification, including definitions, will control. In addition, the materials, methods, and examples described herein are illustrative only and are not intended to be limiting.

Other features and advantages of the invention will be apparent from and encompassed by the following detailed description and claims.

DETAILED DESCRIPTION OF THE INVENTION

The invention provides microbial compositions for augmenting the treatment of commercial, public, and private recreational water systems such as swimming pools, spas, hot tubs or the like, and includes both salt water and fresh water systems.

In some aspects the microbial compositions contain a mixture of *Bacillus*. In various aspects the mixture contains at least one to seven different strains of *Bacillus*. In some embodiments, the composition does not contain any other microorganisms other than *Bacillus*. For example, in some embodiments, the compositions of the invention do not contain any *Lactobacillus* organisms. Alternatively, the microbial compositions of the invention include a mixture of *Bacillus* and *Lactobacillus*.

Preferred strains of *Bacillus* include for example, *Bacillus subtilis, Bacillus amyloliquefaciens, Bacillus licheniformis, Bacillus pumilus, Bacillus megaterium, Bacillus coagulans*, or *Paenibacillus polymyxa, Bacillus subtilis* includes *Bacillus mojavensis* or *Bacillus subtilis* 34KLB.

*Bacillus subtilis* 34KLB has the following sequence:

```
Bacillus subtilis strain 34KLB
                                     (SEQ ID NO.: 1)
AGCTCGGATCCACTAGTAACGGCCGCCAGTGTGCTGGAATTCGCCCTTAG

AAAGGAGGTGATCCAGCCGCACCTTCCGATACGGCTACCTTGTTACGACT

TCACCCCAATCATCTGTCCCACCTTCGGCGGCTGGCTCCATAAAGGTTAC

CTCACCGACTTCGGGTGTTACAAACTCTCGTGGTGTGACGGGCGGTGTGT

ACAAGGCCCGGGAACGTATTCACCGCGGCATGCTGATCCGCGATTACTAG

CGATTCCAGCTTCACGCAGTCGAGTTGCAGACTGCGATCCGAACTGAGAA

CAGATTTGTGRGATTGGCTTAACCTCGCGGTTTCGCTGCCCTTTGTTCTG

TCCATTGTAGCACGTGTGTAGCCCAGGTCATAAGGGGCATGATGATTTGA

CGTCATCCCCACCTTCCTCCGGTTTGTCACCGGCAGTCACCTTAGAGTGC

CCAACTGAATGCTGGCAACTAAGATCAAGGGTTGCGCTCGTTGCGGGACT

TAACCCAACATCTCACGACACGAGCTGACGACAACCATGCACCACCTGTC

ACTCTGCCCCCGAAGGGGACGTCCTATCTCTAGGATTGTCAGAGGATGTC

AAGACCTGGTAAGGTTCTTCGCGTTGCTTCGAATTAAACCACATGCTCCA

CCGCTTGTGCGGGCCCCCGTCAATTCCTTTGAGTTTCAGTCTTGCGACCG

TACTCCCCAGGCGGAGTGCTTAATGCGTTAGCTGCAGCACTAAAGGGGCG

GAAACCCCCTAACACTTAGCACTCATCGTTTACGGCGTGGACTACCAGGG

TATCTAATCCTGTTCGCTCCCCACGCTTTCGCTCCTCAGCGTCAGTTACA

GACCAGAGAGTCGCCTTCGCCACTGGTGTTCCTCCACATCTCTACGCATT

TCACCGCTACACGTGGAATTCCACTCTCCTCTTCTGCACTCAAGTTCCCC

AGTTTCCAATGACCCTCCCCGGTTGAGCCGGGGCTTTCACATCAGACTT

AAGAAACCGCCTGCGAGCCCTTTACGCCCAATAAtTCCGGACAACGCTTG

CCACCTACGTATTACCGCGGCTGCTGGCACGTAGTTAGCCGTGGCTTTCT
```

-continued
```
GGTTAGGTACCGTCAAGGTGCCGCCCTATTTGAACGGCACTTGTTCTTCC

CTAACAACAGAGCTTTACGATCCGAAAACCTTCATCACTCACGCGGCGTT

GCTCCGTCAGACTTTCGTCCATTGCGGAAGATTCCCTACTGCTGCCTCCC

GTAGGAGTCTGGGCCGTGTCTCAGTCCCAGTGTGGCCGATCACCCTCTCA

GGTCGGCTACGCATCGTCGCCTTGGTGAGCCGTTACCTCACCAACTAGCT

AATGCGCCGCGGGTCCATCTGTAAGTGGTAGCCGAAGCCACCTTTTATGT

CTGAACCATGCGGTTCAGACAACCATCCGGTATTAGCCCCGGTTTCCCCG

AGTTATCCCAGTCTTACAGGCAGGTTACCCACGTGTTACTCACCCGTCCG

CCGCTAACATCAGGGAGCAAGCTCCCATCTGTCCGCTCGACTTGCATGTA

TTAGGCACGCCGCCAGCGTTCGTCCTGAGCCATGAACAAACTCTAAGGGC

GAATTCTGCAGATATCCATCACACTGGCGGCCGCTCGAGCATGCATCTAG

AGGGCCCAATCGCCCTAT
```

Preferred strains of *Lactobacillus* include for example, *Pediococcus acidilactici, Pediococcus pentosaceus* and *Lactobacillus plantarum*.

The composition further includes a supplemental fat, oil, or grease component. The supplemental fat, oil, or grease component is present at about 0.1 to 10% by weight, e.g., about 0.1 to 9% by weight, about 0.1 to 8% by weight, about 0.1 to 7% by weight, about 0.1 to 6% by weight, about 0.1 to 5% by weight, about 1 to 9% by weight, about 1 to 8% by weight, about 1 to 7% by weight, about 1 to 6% by weight, or about 1 to 5% by weight. The supplemental fat, oil, or grease component is present at about 1% by weight, about 2% by weight, about 3% by weight, about 4% by weight, about 5% by weight, about 6% by weight, about 7% by weight, about 8% by weight, about 9% by weight, or about 10% by weight. Preferably the supplemental fat, oil, or grease component is present at about 1% by weight.

The supplemental fat, oil, or grease component is for example, triolein, tristearin, tripalmitin, soy lecithin, olive oil, almond oil, peanut oil, sunflower oil, rapeseed oil, soybean oil, linseed oil, corn oil, cod liver oil, palm oil, coconut oil, cacao butter, or various esters of lauric, myristic, oleic, palmitoleic, linoleic or arachinonic acids, and mixtures thereof, with glycerol, methanol, ethanol, propanol or isopropanol. Preferably, the supplemental fat, oil, or grease component is olive oil. More preferably, the supplemental fat, oil, or grease component is soy lecithin.

In some embodiments, the composition includes a mixture of *Bacillus* that includes *Bacillus subtilis, Bacillus amyloliquefaciens, Bacillus licheniformis*, and *Bacillus pumilus*.

In some embodiments, the composition includes a mixture of *Bacillus* as the sole microorganisms. In other embodiments the composition includes a mixture of *Bacillus* and *Lactobacillus* organisms.

The mixture of *Bacillus* includes about 10-50% *Bacillus subtilis* by weight (e.g., about 10%, about 15%, about 20%, about 25%, about 30%, about 35%, about 40%, about 45%, or about 50% by weight). The *Bacillus* mixture includes about 10-50% *Bacillus amyloliquefaciens* by weight (e.g., about 10%, about 15%, about 20%, about 25%, about 30%, about 35%, about 40%, about 45%, or about 50% by weight). The *Bacillus* mixture includes about 10-50% *Bacillus licheniformis* by weight (e.g., about 10%, about 15%, about 20%, about 25%, about 30%, about 35%, about 40%, about 45%, or about 50% by weight). The *Bacillus* mixture includes about 10-50% *Bacillus pumilus* by weight (e.g., about 10%6, about 15%, about 20%, about 25%, about 30%, about 35%, about 40%, about 45%, or about 50% by weight).

The composition can further include a mixture of *Lactobacillus*. Preferred *Lactobacillus* species include *Pediococcus acidilactici, Pediococcus pentosaceus*, and *Lactobacillus plantarum*. In one embodiment, the mixture of *Lactobacillus* includes *Pediococcus acidilactici, Pediococcus pentosaceus, Lactobacillus plantarum*, or a combination thereof. In one embodiment, the mixture of *Lactobacillus* includes a combination of *Pediococcus acidilactici, Pediococcus pentosaceus*, and *Lactobacillus plantarum*. In such compositions, the weight ratio of *Bacillus* to *Lactobacillus* ranges from 1:10 to 10:1 (e.g., 1:10, 1:9, 1:8, 1:7, 1:6, 1:5, 1:4, 1:3, 1:2, 1:1, 2:1, 3:1, 4:1, 5:1, 6:1, 7:1, 8:1, 9:1 or 10:1). Preferably, the weight ratio of *Bacillus* to *Lactobacillus* is about 1:3.3. Other preferred compositions include those wherein the *Lactobacillus* species are mixed together in a ratio of 1:1:1.

The mixture of *Lactobacillus* includes about 10-50% *Pediococcus acidilactici* by weight (e.g., about 10%, about 15%, about 20%, about 25%, about 30%, about 35%, about 40%, about 45%, or about 50% by weight). Preferably, the mixture includes about 30% to 35% *Pediococcus acidilactici* by weight. The mixture of *Lactobacillus* includes about 10-50% *Pediococcus pentosaceus* by weight (e.g., about 10%, about 15%, about 20%, about 25%, about 30%, about 35%, about 40%, about 45%, or about 50% by weight). Preferably, the mixture includes about 30% to 35% *Pediococcus pentosaceus* by weight. The mixture of *Lactobacillus* includes about 10-50% *Lactobacillus plantarum* by weight (e.g., about 10%, about 15%, about 20%, about 25%, about 30%, about 35%, about 40%, about 45%, or about 50% by weight). Preferably, the mixture includes about 30% to 35% *Lactobacillus plantarum* by weight. More preferably the *Lactobacillus* is present in the mixture in equal amounts by weight. Most preferably the mixture contains about 33.3% *Pediococcus acidilactici* by weight, 33.3% *Pediococcus pentosaceus* by weight and about 33.3% *Lactobacillus plantarum* by weight.

A first preferred mixture of *Bacillus* includes 10% by weight *Bacillus licheniformis*, 30% by weight *Bacillus pumilus*, 30% by weight *Bacillus amyloliquefaciens* and 30% by weight *Bacillus subtilis* (referred to herein as *Bacillus* Mix #1). Preferably, the *Bacillus subtilis* in *Bacillus* Mix #1 is *Bacillus subtilis* subsp. *Mojavensis*.

A second preferred mixture of *Bacillus* includes 20% by weight *Bacillus licheniformis*, 30% by weight *Bacillus pumilus*, 30% by weight *Bacillus amyloliquefaciens* and 20% by weight *Bacillus subtilis* (referred to herein as *Bacillus* Mix #2).

A third preferred mixture of *Bacillus* includes *Bacillus subtilis* 34 KLB (referred to herein as *Bacillus* Mix #3).

A preferred *Lactobacillus* mixture includes equal weights of *Pediococcus acidilactici, Pediococcus pentosaceus* and *Lactobacillus plantarum* (referred to herein as *Lactobacillus* Mix #1).

In one embodiment, a composition according to the invention includes at least about 85% by weight of dextrose, about 1 to 10% of soy lecithin, about 0.1 to 5% by weight of *Bacillus* Mix#1, about 0.1 to 5% by weight of *Bacillus* Mix#2, about 0.1 to 5% *Bacillus* Mix #3 and about 0.1 to 5% by weight of *Lactobacillus* Mix #1. For example, the composition according to the invention includes about 0.1 to 4%, 0.1 to 3%, 0.1 to 2% or 0.5 to 1.5% by weight of *Bacillus* Mix#1, about 0.1 to 4%, 0.1 to 3%, 0.1 to 2% or 0.5 to 1.5% by weight of *Bacillus* Mix#2, 0.1 to 4%, 0.1 to 3%, 0.1 to 2% or 0.5 to 1.5% by weight of *Bacillus* Mix#3, and about 0.1 to 4%, 0.1 to 3%, 0.1 to 2% or 0.5 to 1.5% by weight of *Lactobacillus* Mix #1.

Another composition according to the invention includes about 95% by weight of dextrose, about 3% by weight of soy lecithin, about 0.5% by weight of *Bacillus* Mix#1, about 0.5% by weight of *Bacillus* Mix#2, about 0.5% *Bacillus* Mix #3 and about 0.35% by weight of *Lactobacillus* Mix #1.

Another composition according to the invention includes about 92% by weight of dextrose, about 3% by weight of soy lecithin, about 0.5% by weight of *Bacillus* Mix#1, about 0.5% by weight of *Bacillus* Mix#2, about 0.5% *Bacillus* Mix #3 and about 3.5% by weight of *Lactobacillus* Mix #1.

In one embodiment, the composition includes only microorganisms from the species *Bacillus subtilis, Bacillus amyloliquefaciens, Bacillus licheniformis*, and *Bacillus pumilus*. For example each of the *Bacillus* is present in the composition from about 0.1% to 10% by weight. Preferably, each of the *Bacillus* is present from about 0.1%, 0.2%, 0.3%, 0.4%, 0.5%, 0.6%, 0.7%, 0.8%, 0.9%, 1%, 2%, 3%, 4% or 5% by weight. In one embodiment, each of the *Bacillus* species is present in equal amounts by weight.

In another preferred composition includes only microorganisms from the species *Bacillus subtilis, Bacillus amyloliquefaciens, Bacillus licheniformis, Bacillus pumilus, Bacillus megaterium, Bacillus coagulans*, or *Paenibacillus polymyxa*. For example each of the *Bacillus* is present in the composition from about 0.1% to 10% by weight. Preferably, each of the *Bacillus* is present from about 0.1%, 0.2%, 0.3%, 0.4%, 0.5%, 0.6%, 0.7/0%, 0.8%, 0.9%, 1%, 2%, 3%, 4% or 5% by weight. In one embodiment, each of the *Bacillus* species is present in equal amounts by weight.

In yet another preferred composition includes only microorganisms from the species *Bacillus subtilis, Bacillus amyloliquefaciens, Bacillus licheniformis, Bacillus pumilus, Bacillus megalerium, Bacillus coagulans*, or *Paenibacillus polymyxa*, and a supplemental fat, oil, or grease component. For example each of the *Bacillus* is present from about 0.1% to 10% by weight. Preferably, each of the *Bacillus* is present from about 0.1%, 0.2%, 0.3%, 0.4%, 0.5%, 0.6%, 0.7%, 0.8%, 0.9%, 1%, 2%, 3%, 4% or 5% by weight. The supplemental fat, oil, or grease component is present at about 0.1 to 10% by weight. Preferably the supplemental fat, oil, or grease component is present at about 1 to 3% by weight. In one embodiment, each of the *Bacillus* species is present in equal amounts by weight.

In some aspects the composition includes at least 50%, preferably at least 75%, and most preferably at least 90% by weight of an inert carrier. In some embodiments the composition includes at least 60%, 70%, 75%, 80%, 85%, 91%, 92%, 93%, 94%, 95%, 96%, 97%, 98%, or 99% by weight of an inert carrier. In some embodiments, the composition includes 50%-99% by weight of an inert carrier. In some embodiments, the composition includes 60%-99% by weight of an inert carrier. In some embodiments, the composition includes 70%-99% by weight of an inert carrier. In some embodiments, the composition includes 75%-99% by weight of an inert carrier. In some embodiments, the composition includes 80%-99% by weight of an inert carrier.

An inert carrier includes for example, anhydrous dextrose, dextrose monohydrate, maltodextrin, dendritic salt, rice bran, wheat bran, oat bran, soybean meal, rice hulls, or a mixture thereof. Preferably, the inert carrier is dextrose monohydrate The bacteria in the composition can be in the form of spores. These spores can grow under certain conditions favorable for germination, e.g., addition of water or favorable temperature. The bacteria in the composition can also be in a vegetative state. Bacteria in a vegetative state are relatively easy to germinate, e.g., in the presence of a carbon source. A composition according to the invention can include some bacteria in the form of spores and some bacteria in a vegetative state. For example, at least 5% by weight of the bacteria in the composition is in the form of spores, e.g., at least 10% by weight, at least 20% by weight, at least 30% by weight, at least 40% by weight, at least 50% by weight, at least 60% by weight, or at least 70% by weight. For example, at least 5% by weight of the bacteria in the composition is in a vegetative state, e.g., at least 10/o by weight, at least 20%0/by weight, at least 30% by weight, at least 40% by weight, at least 50% by weight, at least 60% by weight, or at least 70% by weight.

Importantly, the composition fully disperses upon the addition to water and unlike other water treatment microbial compositions the compositions do not require a pre-activation of the bacteria prior to use.

The microbial compositions increase clarity of the water by hydrolyzing fats, oils and grease (FOG) in swimming pool water to their constituent fatty acids and alcohols while, at the same time, creating a liquid, surface active, monomolecular film at the air-water interface that aids in reducing water evaporation and in maintaining water temperature.

The term "microbial", "bacteria" or "microbes" as used herein, refers to micro-organisms that confer a benefit. The microbes according to the invention may be viable or non-viable. The non-viable microbes are metabolically-active. By "metabolically-active" as used herein is meant that they exhibit at least some residual enzyme, or secondary metabolite activity characteristic to that type of microbe.

By the term "non-viable" as used herein is meant a population of bacteria that is not capable of replicating under any known conditions. However, it is to be understood that due to normal biological variations in a population, a small percentage of the population (i.e., 5% or less) may still be viable and thus capable of replication under suitable growing conditions in a population which is otherwise defined as non-viable.

By the term "viable bacteria" as used herein is meant a population of bacteria that is capable of replicating under suitable conditions in which replication is possible. A population of bacteria that does not fulfill the definition of "non-viable" (as given above) is considered to be "viable".

The term "swimming pools" as used herein are meant to include swimming pools, spas, hot tubs or the like, and includes both salt water and fresh water systems.

"Treating" as used herein means inoculating water with microbes designed to enhance efficient degradation of FOG. In some aspects of the invention, inoculation is achieved by adding the composition of the invention to the skimmer. In other aspects, inoculation is achieved by simply adding the composition directly into the main body water. In yet another aspect of the invention, inoculation is achieved through a dosing device, added to the main water body, which allows for the gradual release of the microbial composition over time.

Unless stated otherwise, all percentages mentioned in this document are by weight based on the total weight of the composition.

The microbes used in the product according to the present invention may be any conventional mesophilic bacteria. It is preferred that the bacteria are selected from the Bacillaceae family. More preferably the bacteria selected from the genre *Bacillus* are included in the compositions of the invention.

In preferred compositions, the mixture contains *Bacillus subtilis, Bacillus amyloliquefaciens, Bacillus licheniformis, Bacillus pumilus, Bacillus megaterium, Bacillus coagulans*, and *Paenibacillus polymyxa*. In another preferred composition the mixture contains *Bacillus subtilis, Bacillus amyloliquefaciens, Bacillus licheniformis*, and *Bacillus pumilus*.

The levels of the bacteria to be used according to the present invention will depend upon the types thereof. It is preferred that the present product contains bacteria in an amount between about $10^5$ and $10^{11}$ colony forming units (CFUs) per gram. Preferably the bacteria is in an amount of at least $10^9$ colony forming units (CFUs) per gram.

The bacteria according to the invention may be produced using any standard fermentation process known in the art. For example, solid substrate or submerged liquid fermentation. The fermented cultures can be mixed cultures or single isolates.

The bacterial compositions are in powdered, dried form. Alternatively, the bacterial compositions are in liquid form.

After fermentation the bacteria may be harvested by any known methods in the art. For example the bacteria are harvested by filtration or centrifugation.

The bacteria are dried by any method known in the art. For example the bacteria are air dried, or dried by freezing in liquid nitrogen followed by lyophilization.

The compositions according to the invention have been dried to a moisture content less than 20%, 15%, 10% 9%, 8%, 7%, 6%, 5%, 4%, 3%, 2%, or 1%. Preferably, the composition according to the invention has been dried to moisture content less than 5%.

In some embodiments the dried powder is ground to decrease the particle size. The bacteria are ground by conical grinding at a temperature less than 10° C., 9° C., 8° C., 7° C., 6° C., 5° C., 4° C., 3° C., 1° C., 0° C., or less. Preferably the temperature is less than 4° C.

For example the particle size is less than 1500, 1400, 1300, 1200, 1100, 1000, 900, 800, 700, 600, 500, 400, 300, 200, or 100 microns. Preferably, the freeze dried powder is ground to decrease the particle size such that the particle size is less than 800 microns. Most preferred are particle sizes less than about 400 microns. In most preferred embodiments, the dried powder has a mean particle size of 200 microns, with 60% of the mixture in the size range between 100-800 microns. In another most preferred embodiment, the dried powder has a mean particle size of 295 microns, with 60% of the mixture in the size range between 175-840 microns. In various embodiments the freeze dried powder is homogenized.

Further, if desired, the bacterial compositions may be encapsulated to further increase the probability of survival, for example in a sugar matrix, fat matrix or polysaccharide matrix.

The compositions of the invention are used to treat both fresh and salt water commercial, municipal, industrial, or residential swimming pools, spas, hot tubs and the like.

An aqueous solution of the dry composition according to the invention can be employed to increase clarity of the water by decreasing FOG concentrations while, simultaneously, generating free fatty acids that can form a monolayer at the air-water surface to help reduce water evaporation and maintain pool temperature (e.g., better heat retention).

The application of the compositions of the present invention to recreational water systems also provides an energy saving benefit by reducing heat loss, reducing head pressure at the filter due to the build-up of FOG material and reduced pump run time.

The compositions of the invention may also be used to treat swimming pools to remove scum and reduce algae.

Solutions of the composition can be pumped into the system to be treated or sprayed onto the surface, or into the airspace surrounding the material, or applied to a filter through which the water to be cleaned is passed. Alternatively, dosing device that is added to the pool and allows the composition to release over a period of time. The dry material can be mixed into a slurry or solution at the point of application and applied in a similar manner.

The compositions of the invention are manufactured by any method suitable for production of bacterial compositions. Preferably, mixtures containing either multiple *Bacillus* species or mixtures of *Bacillus* and *Lactobacillus*, are manufactured by individually fermenting each organism under conditions ideal for growth of that specific organism; harvesting each organism; drying the harvested organisms; grinding the dried organisms to produce a powder; then, combining each individual organism into the final mix. For compositions comprising mixtures of *Bacillus* species only, the individual *Bacillus* organisms are mixed together at equal levels. For compositions comprising mixtures of *Bacillus* and *Lactobacillus* the ratio of *Bacillus* to *Lactobacillus* ranges from 1:10 to 10:1. The *Bacillus* organisms of the invention include *Bacillus subtilis, Bacillus amyloliquefaciens, Bacillus licheniformis, Bacillus pumilus, Bacillus megaterium, Bacillus coagulans*, and *Paenibacillus polymyxa*. The *Lactobacillus* organisms of the invention include *Pediococcus acidilactici, Pediococcus pentosaceus*, and *Lactobacillus plantarum*.

A better understanding of the present invention may be given with the following examples which are set forth to illustrate, but are not to be construed to limit the present invention.

EXAMPLES

Example 1: Preparation of the Microbial Species

Figure 1:
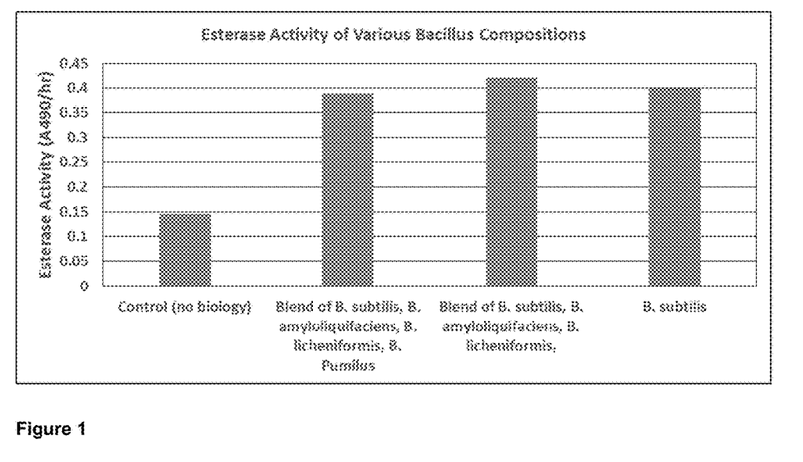
FIG. 1 is a graph showing the rates of esterase production of various *Bacillus* organisms.

The microbial species of the present invention may be made by any of the standard fermentation processes known in the art. In the following examples, both solid state and submerged liquid fermentation processes are described. *Bacillus* species with demonstrated high rates of esterase production were selected for growth (FIG. 1).

Solid State Fermentation

Individual purified isolates of *Bacillus subtilis, Bacillus amyloliquefaciens. Bacillus licheniformis, Bacillus pumilus, Bacillus megalerium, Bacillus coagulans*, and *Paenibacillus polymyxa* were grown-up in separate fermenters using standard aerobic submerged liquid fermentation protocols. The individual organisms were recovered from the fermenters via centrifugation, mixed together in equal proportions on a weight basis, then added to the following mixture: 1 part inulin, 2.2 parts isolated soy protein, 8 parts rice flour with 0.25% w/w sodium chloride, 0.045% w/w Calcium carbonate, 0.025% w/w Magnesium sulphate, 0.025% w/w Sodium phosphate, 0.012% w/w Ferrous sulphate and 29.6% water. This mixture was allowed to ferment for up to 5 days at 30° C. Upon completion of the fermentation, the entire mixture was freeze dried to a moisture content less than 5%, ground to an average particle size of 295 microns, with 60% of the product in the size range between 175-840 microns, and homogenized. The final microbial concentration of the powdered product is between $10^9$ and $10^{11}$ CFU/g.

Submerged Liquid Fermentation

Individual starter cultures of *Bacillus subtilis, Bacillus amyloliquefaciens. Bacillus licheniformis, Bacillus pumilus, Bacillus megalerium, Bacillus coagulans*, and *Paenibacillus polymyxa* are grown according to the following general protocol: 2 grams nutrient broth, 2 grams AmberFerm (yeast extract), and 4 grams Maltodextrin are added to a 250 ml Erlenmeyer flask, 100 milliliters distilled, deionized water was added and the flask stirred until all dry ingredients were dissolved. The flask was covered and placed for 30 min. in an Autoclave operating at 121° C. and 15 psi. After cooling, the flask was inoculated with 1 ml of one of the pure microbial strains. The flask was sealed and placed on an orbital shaker at 30° C. Cultures were allowed to grow for 3-5 days. This process was repeated for each of the microorganisms in the mixture. This process provided starter cultures of each organism which were then used to prepare larger scale fermentations. Individual fermenters were run under aerobic conditions at pH 7 at the temperature optimal for each species:

| Microbe | Temperature Optimum |
| --- | --- |
| *Bacillus subtilis* | 35° C. |
| *Bacillus amyloliquefaciens* | 30° C. |
| *Bacillus licheniformis* | 37° C. |
| *Bacillus coagulans* | 37° C. |
| *Bacillus megaterium* | 30° C. |
| *Bacillus pumilus* | 32° C. |
| *Paenibacillus polymyxa* | 30° C. |

Example 2: Formulation of Swimming Pool Treatment Products

The following formulations were prepared by dry blending the ingredients in a ribbon blender (all percentages are by weight):

| | COMPOSITIONS | | | |
| --- | --- | --- | --- | --- |
| Ingredients | A | B | C | D |
| *Bacillus subtilis* | 1 | 0.1 | 0.1 | 0.1 |
| *Bacillus amyloliquefaciens* | 1 | 0.1 | 0.1 | 0.1 |
| *Bacillus licheniformis* | 1 | 0.1 | 0.1 | 0.1 |
| *Bacillus pumilus* | 1 | 0.1 | 0.1 | 0.1 |
| *Bacillus megaterium* | — | — | 0.1 | — |
| *Bacillus coagulans* | — | — | 0.1 | — |
| *Panibacillus polymyxa* | — | — | 0.1 | — |
| Olive oil | — | — | — | 1 |
| Dextrose | 96 | 99.6 | 99.3 | 98.6 |

Example 3: Water Clarification

The conditions of a typical swimming pool (chlorine level, temperature) were mimicked in the laboratory using 10 gallon aquaria fitted with a filter and circulation pump. The composition of Example 2B was evaluated for its ability to clarify the water after addition of 250 ppm Sunscreen. Results are in FIG. 2.

Figure 2:
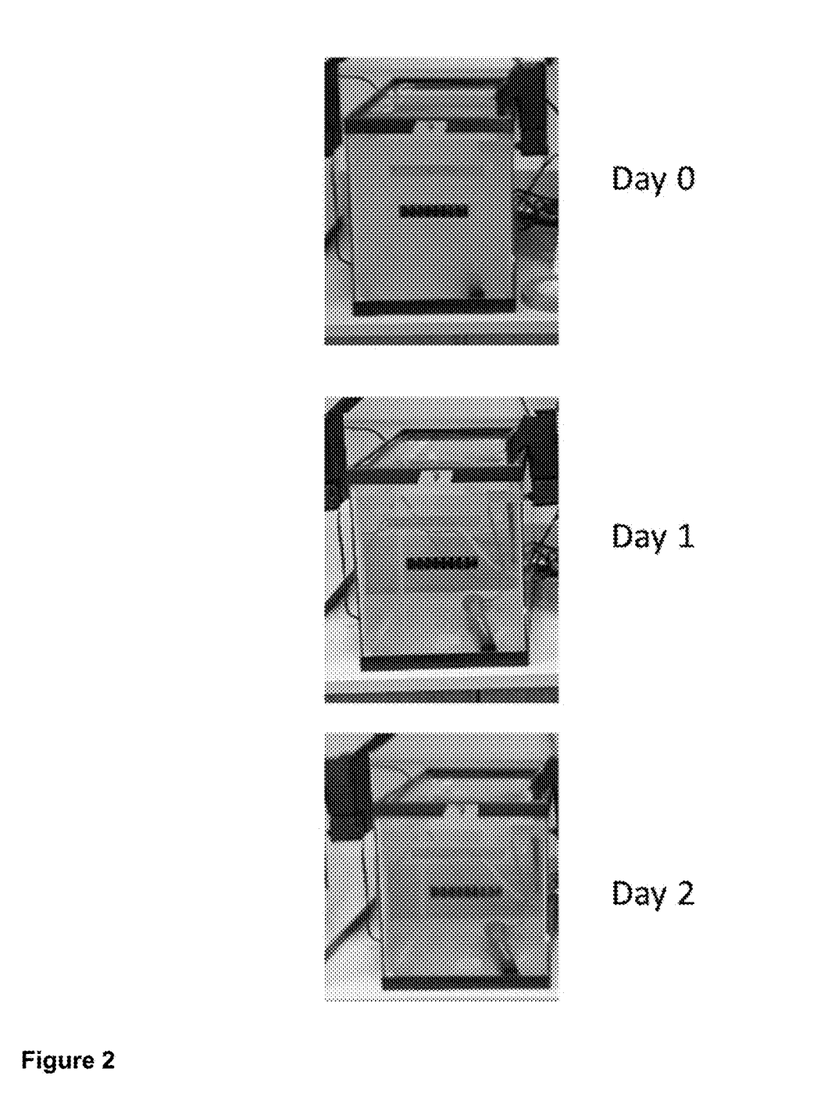
FIG. 2 is a series of figures showing increased water clarity after dosing the water with the composition of the invention.

Significant clarification is noted in as little as 24 hours. Separate respirometer analysis with sunscreen as a substrate showed significant $CO_2$ generation and $0_2$ consumption when the composition of Example 2B is added.

Example 4: Water Evaporation Study 10 milliliters of olive oil are added to 1 liter of simulated pool water (2 ppm chlorine, water temperature=30° C., 50 ppm calcium, 50 ppm magnesium, 100 ppm cyanuric acid). This system is allowed to sit uncovered at 30° C. for two days after which the remaining water volume is noted.

A second system is prepared identical to the above. After addition of the olive oil, 1 ppm of the composition from Example 2B is added with stirring. The sample is placed at 30° C., uncovered, and incubated for two days after which the remaining water volume is noted.

Other Embodiments

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

We claim:

1. A method of reducing water evaporation in a swimming pool, the method comprising contacting water in the swimming pool with a composition comprising a mixture of bacteria that includes *Bacillus subtilis, Bacillus amyloliquefaciens, Bacillus licheniformis, Bacillus pumilus, Bacillus Mojavensis*, and *Bacillus subtilis* 34KLB, wherein the mixture of bacteria breaks down fats, oils, and grease (FOG) in the water, thereby creating a film on the surface of the swimming pool to reduce water evaporation.

2. The method of claim 1, wherein each of the bacteria in the mixture is individually aerobically fermented, harvested, dried, and ground to produce a mixture having a mean particle size of about 200 microns, with greater than about 60% of the powder in the size range between 100-800 microns.

3. The method of claim 1, wherein the composition further comprises *Pediococcus acidilactici, Pediococcus pentosaceus*, and *Lactobacillus plantarum*.

4. The method of claim 1, wherein the composition further comprises an inert carrier.

5. The method of claim 4, wherein the inert carrier is anhydrous dextrose, dextrose monohydrate, dendritic salt or a mixture thereof.

6. The method of claim 1, wherein the composition further comprises from 0.1 to 10% by weight of a supplemental FOG component.

7. The method of claim 6, wherein the supplemental FOG component is triolein, tristearin, tripalmitin, soy lecithin, olive oil, almond oil, peanut oil, sunflower oil, rapeseed oil, soybean oil, linseed oil, corn oil, cod liver oil, palm oil, coconut oil, cacao butter, or an ester of lauric, myristic, oleic, palmitoleic, linoleic or arachinonic acids, with glycerol, methanol, ethanol, propanol or isopropanol.

8. The method of claim 5, wherein the inert carrier is dextrose monohydrate.

9. The method of claim 1, wherein the composition has a moisture content of less than about 5%; and a final bacterial concentration of about $10^5$-$10^{11}$ colony forming units (CFU) per gram of the composition.

10. The method of claim 4, wherein the inert carrier is at a concentration of about between 75-99.9% (w/w).

11. The method of claim 1, wherein the water is contacted by contacting a swimming pool filtration unit with the composition.

12. The method of claim 1, wherein the composition is delivered directly into the water.

13. The method of claim 1, wherein the composition is contained in a dosing device that is added to the pool and allows the composition to release over a period of time.

14. The method of claim 6, wherein the supplemental FOG component is olive oil or soy lecithin.

15. The method of claim 3, wherein *Pediococcus acidilactici, Pediococcus pentosaceus*, and *Lactobacillus plantarum* are mixed at a ratio of 1:1:1 by weight.

16. The method of claim 3, wherein the weight ratio of *Bacillus subtilis, Bacillus amyloliquefaciens, Bacillus licheniformis, Bacillus pumilus, Bacillus Mojavensis*, and *Bacillus subtilis* 34KLB over *Pediococcus acidilactici, Pediococcus pentosaceus*, and *Lactobacillus plantarum* is in the range of 1:10 to 10:1.

17. The method of claim 1, wherein the composition comprises a first *Bacillus* Mix, a second *Bacillus* Mix, and a third *Bacillus* Mix, and wherein the first *Bacillus* Mix comprises 10% *Bacillus licheniformis* by weight, 30% *Bacillus pumilus* by weight, 30% *Bacillus amyloliquefaciens* by weight, and 30% *Bacillus Mojavensis* by weight, the second *Bacillus* Mix comprises 20% *Bacillus licheniformis* by weight, 30% *Bacillus pumilus* by weight, 30% *Bacillus amyloliquefaciens* by weight, and 20% *Bacillus subtilis* by weight, and the third *Bacillus* Mix comprises *Bacillus subtilis* 34KLB.

18. The method of claim 17, wherein the composition comprises 0.1 to 5% the first *Bacillus* Mix by weight.

19. The method of claim 17, wherein the composition comprises 0.1 to 5% the second *Bacillus* Mix by weight.

20. The method of claim 17, wherein the composition comprises 0.1 to 5% the third *Bacillus* Mix by weight.

21. The method of claim 3, wherein the composition comprises 0.1 to 5% *Pediococcus acidilactici, Pediococcus pentosaceus*, and *Lactobacillus plantarum* by weight.

22. The method of claim 1, wherein the composition is in a dry or liquid form.

\* \* \* \* \*